US009873797B2

United States Patent
Rodriguez et al.

(10) Patent No.: US 9,873,797 B2
(45) Date of Patent: Jan. 23, 2018

(54) PROCESS FOR THE PRODUCTION OF CARBON BLACK

(71) Applicant: ADITYA BIRLA NUVO LIMITED, Mumbai (IN)

(72) Inventors: Juan Rodriguez, Mumbai (IN); Ranjan Ghosal, Navi Mumbai (IN); Sunil Kumar Narayanan, Kerala (IN)

(*) Notice: Subject to any disclaimer, the term of this patent is extended or adjusted under 35 U.S.C. 154(b) by 0 days.

(21) Appl. No.: 14/353,610

(22) PCT Filed: Oct. 23, 2012

(86) PCT No.: PCT/IN2012/000698
§ 371 (c)(1),
(2) Date: Apr. 23, 2014

(87) PCT Pub. No.: WO2013/098838
PCT Pub. Date: Jul. 4, 2013

(65) Prior Publication Data
US 2014/0290532 A1    Oct. 2, 2014

(30) Foreign Application Priority Data

Oct. 24, 2011  (IN) .......... 2992/MUM/2011

(51) Int. Cl.
| C09C 1/44 | (2006.01) |
| C09C 1/56 | (2006.01) |
| C08K 9/02 | (2006.01) |
| C09C 1/48 | (2006.01) |

(52) U.S. Cl.
CPC .............. *C09C 1/56* (2013.01); *C08K 9/02* (2013.01); *C09C 1/48* (2013.01); *C01P 2006/80* (2013.01)

(58) Field of Classification Search
None
See application file for complete search history.

(56) References Cited

U.S. PATENT DOCUMENTS

| 560,218 A | 5/1896 | Joslyn |
| 1,938,672 A | 12/1933 | Ruthruff |
| 1,952,616 A | 3/1934 | Vose |
| 2,436,550 A | 2/1948 | Brandon |

(Continued)

FOREIGN PATENT DOCUMENTS

| BR | 1120130242698 | 3/2012 |
| BR | 1120130264985 | 4/2012 |

(Continued)

OTHER PUBLICATIONS

Fourth Office Action was issued Aug. 12, 2016 by the State intellectual Property Office of the People's Republic of China for CN Application No. 201280018300.1, which was filed on Apr. 12, 2012 and published as CN103635241A on Mar. 12, 2014 (Inventor—Sandeep Vasant Chavan et al; Applicant—Aditya Birla Nuvo Limited) (Original 8 Pages // Translated 9 Pages).

(Continued)

*Primary Examiner* — Kaj K Olsen
*Assistant Examiner* — Ross J Christie
(74) *Attorney, Agent, or Firm* — Ballard Spahr LLP

(57) ABSTRACT

A process for treating carbon black with a sulfur-containing compound to obtain a surface modified carbon black that can decrease the hysteresis of a polymer composition by at least 1%.

11 Claims, 2 Drawing Sheets

(56) References Cited

U.S. PATENT DOCUMENTS

Figure 1:
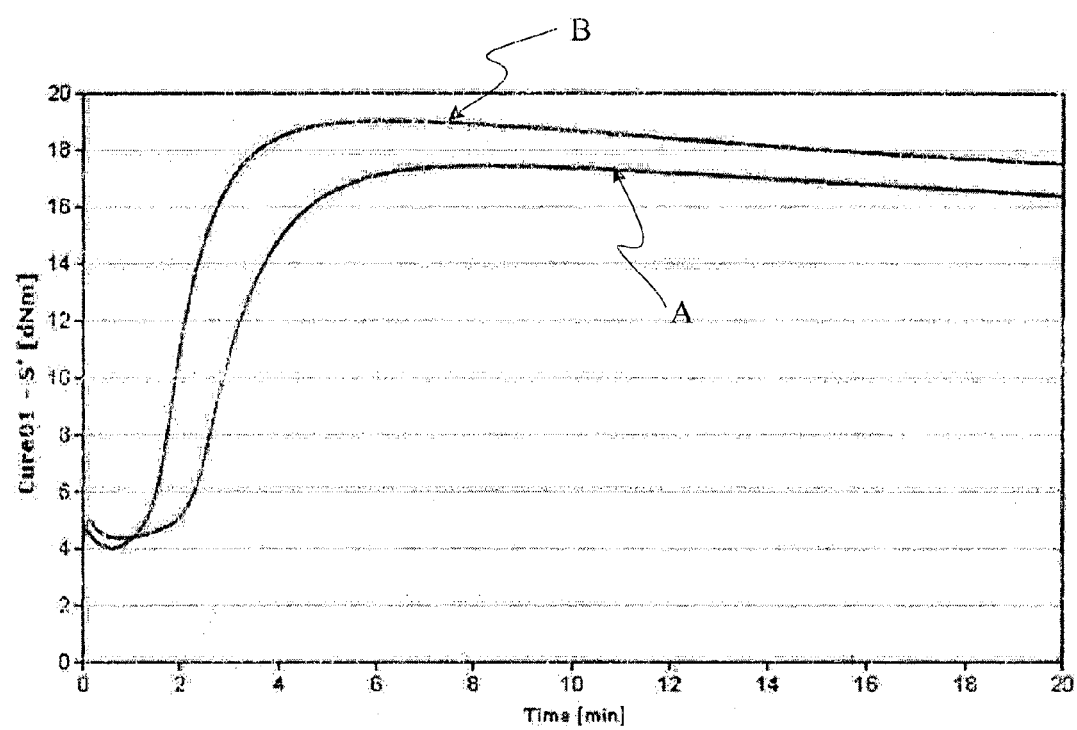

| | | | |
|---|---|---|---|
| 2,486,519 A | 11/1949 | Chenicek | |
| 2,516,877 A | 8/1950 | Horne et al. | |
| 2,537,756 A | 1/1951 | Heinemann | |
| 2,561,625 A | 7/1951 | Holmes | |
| 2,578,692 A | 12/1951 | Gieseler | |
| 2,604,436 A | 7/1952 | Adey et al. | |
| 2,623,004 A | 12/1952 | Shalit | |
| 2,634,230 A | 4/1953 | Arnold et al. | |
| 2,640,011 A | 5/1953 | Mason et al. | |
| 2,697,682 A | 12/1954 | Porter | |
| 2,811,502 A | 10/1957 | Gessler et al. | |
| 2,830,881 A | 4/1958 | Wittrock | |
| 2,833,208 A | 5/1958 | Jeffs | |
| 2,850,403 A † | 9/1958 | Day | |
| 2,866,751 A | 12/1958 | Zimmerschied et al. | |
| 2,866,752 A | 12/1958 | Zimmerschied et al. | |
| 2,902,441 A | 9/1959 | May et al. | |
| 2,911,359 A | 11/1959 | Hansford | |
| 2,988,499 A | 6/1961 | Kenny | |
| 2,992,182 A | 7/1961 | Elzinga et al. | |
| 3,004,912 A | 10/1961 | Kaneko et al. | |
| 3,093,575 A | 6/1963 | Kimberlin, Jr. et al. | |
| 3,163,593 A | 12/1964 | Webster et al. | |
| 3,165,378 A | 1/1965 | Greenawalt | |
| 3,320,157 A | 5/1967 | Arey, Jr. et al. | |
| 3,340,081 A * | 9/1967 | Teter | 106/473 |
| 3,413,307 A | 11/1968 | Heimlich et al. | |
| 3,442,679 A | 5/1969 | Rivin et al. | |
| 3,505,210 A | 4/1970 | Wallace et al. | |
| 3,528,840 A * | 9/1970 | Aboytes | 106/473 |
| 3,565,792 A | 2/1971 | Haskett | |
| 3,617,530 A | 11/1971 | Rieve et al. | |
| 3,620,968 A | 11/1971 | Bridge et al. | |
| 3,620,969 A | 11/1971 | Turnock et al. | |
| 3,657,064 A | 4/1972 | Shick | |
| 3,668,116 A | 6/1972 | Adams et al. | |
| 3,698,860 A | 10/1972 | Shiba | |
| 3,755,149 A | 8/1973 | Kohn | |
| 3,779,895 A | 12/1973 | Wilson et al. | |
| 3,787,315 A | 1/1974 | Bearden, Jr. et al. | |
| 3,816,301 A | 6/1974 | Sorgenti | |
| 3,847,800 A | 11/1974 | Guth et al. | |
| 4,003,824 A | 1/1977 | Baird, Jr. et al. | |
| 4,076,613 A | 2/1978 | Bearden, Jr. | |
| 4,119,528 A | 10/1978 | Baird, Jr. et al. | |
| 4,120,779 A | 10/1978 | Baird, Jr. et al. | |
| 4,123,350 A | 10/1978 | Baird, Jr. et al. | |
| 4,147,612 A | 4/1979 | Miasek et al. | |
| 4,193,864 A | 3/1980 | Chang | |
| 4,248,695 A | 2/1981 | Swanson | |
| 4,327,069 A | 4/1982 | Cheng | |
| 4,328,127 A | 5/1982 | Angevine et al. | |
| 4,419,224 A | 12/1983 | Miller et al. | |
| 4,437,980 A | 3/1984 | Heredy et al. | |
| 4,576,710 A | 3/1986 | Nongbri et al. | |
| 4,695,366 A | 9/1987 | Miller et al. | |
| 4,960,506 A | 10/1990 | Halbert et al. | |
| 4,988,493 A | 1/1991 | Norman et al. | |
| 5,159,009 A † | 10/1992 | Wolff | |
| 5,219,542 A | 6/1993 | Lowery et al. | |
| 5,310,717 A | 5/1994 | Delzer et al. | |
| 5,340,465 A | 8/1994 | Gillespie et al. | |
| 5,654,357 A † | 8/1997 | Menashi | |
| 5,677,259 A | 10/1997 | Yamase et al. | |
| 5,824,137 A | 10/1998 | Gutsch et al. | |
| 5,841,229 A | 11/1998 | Borowiec et al. | |
| 5,935,421 A | 8/1999 | Brons et al. | |
| 6,197,274 B1 | 3/2001 | Mahmud et al. | |
| 6,210,564 B1 | 4/2001 | Brons et al. | |
| 6,274,785 B1 | 8/2001 | Gore | |
| 6,277,271 B1 | 8/2001 | Kocal | |
| 6,402,940 B1 | 6/2002 | Rappas | |
| 6,500,219 B1 | 12/2002 | Gunnerman | |
| 6,558,533 B2 | 5/2003 | Schmidt et al. | |
| 6,630,268 B2 * | 10/2003 | Tosco et al. | 106/31.6 |
| 6,794,428 B2 † | 9/2004 | Burrington | |
| 6,962,952 B2 * | 11/2005 | Kawazoe et al. | 524/492 |
| 7,038,090 B1 | 5/2006 | Brandvold et al. | |
| 7,144,499 B2 | 12/2006 | Han et al. | |
| 7,144,943 B2 * | 12/2006 | Kawazoe et al. | 106/475 |
| 7,179,368 B2 | 2/2007 | Rabion et al. | |
| 7,192,516 B2 | 3/2007 | Schucker | |
| 7,241,334 B2 * | 7/2007 | Srinivas | 106/31.6 |
| 7,276,152 B2 | 10/2007 | Lin et al. | |
| 7,291,259 B2 | 11/2007 | Gupta et al. | |
| 7,314,545 B2 | 1/2008 | Karas et al. | |
| 7,507,327 B2 | 3/2009 | Dysard et al. | |
| 7,588,680 B1 | 9/2009 | Schucker | |
| 7,968,635 B2 | 6/2011 | York et al. | |
| 9,114,988 B2 | 8/2015 | Chavan et al. | |
| 9,410,042 B2 | 8/2016 | Chavan et al. | |
| 2001/0009654 A1 * | 7/2001 | Kawazoe et al. | 423/449.2 |
| 2001/0036994 A1 † | 11/2001 | Bergemann | |
| 2002/0022568 A1 | 2/2002 | Mackay et al. | |
| 2002/0169242 A1 * | 11/2002 | Kawazura | 524/261 |
| 2003/0029777 A1 | 2/2003 | Khare | |
| 2003/0188993 A1 | 10/2003 | Khare et al. | |
| 2004/0042955 A1 * | 3/2004 | Srinivas | 106/31.6 |
| 2004/0109816 A1 * | 6/2004 | Srinivas et al. | 423/449.2 |
| 2004/0119190 A1 * | 6/2004 | Kawazoe et al. | 264/140 |
| 2005/0031528 A1 | 2/2005 | Niedermeier et al. | |
| 2005/0040078 A1 | 2/2005 | Zinnen et al. | |
| 2005/0145545 A1 | 7/2005 | Schucker | |
| 2005/0189261 A1 | 9/2005 | Briot et al. | |
| 2006/0022604 A1 | 2/2006 | Takeuchi et al. | |
| 2006/0210564 A1 | 9/2006 | Kumagai et al. | |
| 2006/0226049 A1 | 10/2006 | Nemeth et al. | |
| 2006/0283780 A1 | 12/2006 | Spivey et al. | |
| 2007/0105715 A1 | 5/2007 | Suda et al. | |
| 2007/0227951 A1 | 10/2007 | Thirugnanasampanthar et al. | |
| 2007/0295640 A1 | 12/2007 | Tan et al. | |
| 2008/0308463 A1 | 12/2008 | Keckler et al. | |
| 2009/0000990 A1 | 1/2009 | Toida | |
| 2009/0081515 A1 * | 3/2009 | Shibata et al. | 429/30 |
| 2009/0148374 A1 | 6/2009 | Choi | |
| 2010/0264067 A1 | 10/2010 | Osaheni et al. | |
| 2010/0278709 A1 | 11/2010 | Waller | |
| 2010/0302326 A1 * | 12/2010 | Morohoshi | B41J 2/1433 347/86 |
| 2011/0147274 A1 | 6/2011 | Soto et al. | |
| 2012/0153387 A1 | 6/2012 | Murthy et al. | |
| 2013/0340651 A1 † | 12/2013 | Wampler | |
| 2014/0014557 A1 | 1/2014 | Chavan et al. | |
| 2015/0056127 A1 | 2/2015 | Chavan et al. | |
| 2015/0252272 A1 | 9/2015 | Chavan et al. | |

FOREIGN PATENT DOCUMENTS

| | | |
|---|---|---|
| BR | 1120140098034 | 10/2012 |
| BR | 1120140242631 | 3/2013 |
| CA | 2830881 | 3/2012 |
| CA | 2833208 | 4/2012 |
| CA | 2830881 A1 | 9/2012 |
| CA | 2853211 | 10/2012 |
| CA | 2833208 A1 | 11/2012 |
| CN | 1330127 A | 1/2002 |
| CN | 1481335 A | 3/2004 |
| CN | 1803939 A | 7/2006 |
| CN | 101391940 A | 3/2009 |
| CN | 101445458 A | 6/2009 |
| CN | 101481307 A | 7/2009 |
| CN | 201280014637.5 | 3/2012 |
| CN | 201280018300.1 | 4/2012 |
| CN | 201280060806.9 | 10/2012 |
| CN | 201380020228 | 3/2013 |
| CN | 103534337 A | 1/2014 |
| CN | 103635241 A | 3/2014 |
| CN | 104136551 A | 11/2014 |
| CN | 104334650 A | 2/2015 |
| CN | 104812481 A | 7/2015 |
| EP | 1637556 A1 | 3/2006 |
| EP | 12760070.8 | 3/2012 |
| EP | 12777572.4 | 4/2012 |
| EP | 12862639.7 | 10/2012 |

(56) References Cited

FOREIGN PATENT DOCUMENTS

| | | |
|---|---|---|
| EP | 13753350.1 | 3/2013 |
| EP | 2688984 A2 | 1/2014 |
| EP | 2696954 A2 | 2/2014 |
| EP | 2771414 A2 | 9/2014 |
| EP | 2831182 A2 | 2/2015 |
| EP | 2900370 A2 | 8/2015 |
| GB | 441703 A | 1/1936 |
| GB | 1478490 A | 6/1977 |
| HK | 14107733.1 | 7/2014 |
| HK | 14109275.1 | 9/2014 |
| HK | 1194421 | 11/2014 |
| HK | 1195753 | 11/2014 |
| HK | 15102578.9 | 3/2015 |
| ID | WO2013004798 | 3/2012 |
| ID | WO2013005095 | 4/2012 |
| ID | P00201402994 | 10/2012 |
| ID | P00201406715 | 3/2013 |
| ID | 2014/04195 | 10/2014 |
| ID | 2015/01697 | 4/2015 |
| ID | 2015/03171 | 7/2015 |
| IN | 845/MUM/2011 | 3/2014 |
| JP | 45-013459 | 5/1970 |
| JP | 49-042703 | 4/1974 |
| JP | 50-012871 | 2/1975 |
| JP | 50-014649 | 2/1975 |
| JP | 51-128306 | 11/1976 |
| JP | S6155283 A | 3/1986 |
| JP | 2001-501239 A | 1/2001 |
| JP | 2001-354978 A | 12/2001 |
| JP | 2003-523470 A | 8/2003 |
| JP | 2003-528192 A | 9/2003 |
| JP | 2005-060697 A | 3/2005 |
| JP | 2005-087891 | 4/2005 |
| JP | 2005-307103 A | 11/2005 |
| JP | 2009-176513 A | 8/2009 |
| JP | 46-26402 B2 | 2/2011 |
| JP | 46-37761 B2 | 2/2011 |
| JP | 2012-012450 A | 1/2012 |
| JP | 2012503072 | 2/2012 |
| JP | 2014-500543 | 3/2012 |
| JP | 2014-504453 | 4/2012 |
| JP | 2014-537813 | 10/2012 |
| JP | 50-094002 | 12/2012 |
| JP | 2015-502559 | 3/2013 |
| JP | 2014-504453 A | 2/2014 |
| JP | 2014-517798 A | 7/2014 |
| JP | 2015-501361 A | 1/2015 |
| JP | 2015-514832 A | 5/2015 |
| JP | 5824137 B2 | 11/2015 |
| JP | 5841258 B2 | 1/2016 |
| KR | 10-2013-7027847 | 3/2012 |
| KR | 10-2013-7028911 | 4/2012 |
| KR | 1020147014011 | 10/2012 |
| KR | 1020147030417 | 3/2013 |
| MX | 2013010786 | 3/2012 |
| MX | 2013012042 | 4/2012 |
| MX | 2014004973 | 10/2012 |
| MX | 2014011811 | 3/2013 |
| MX | 2013012042 A | 5/2014 |
| MX | 2014004973 A | 5/2014 |
| MX | 2015003988 | 8/2015 |
| RU | 2013147201 U1 | 6/1994 |
| RU | 2076892 | 4/1997 |
| RU | 2013147201 | 3/2012 |
| RU | 2013150805 | 4/2012 |
| RU | 2014121026 | 10/2012 |
| RU | 2014143796 | 3/2013 |
| RU | 2013147201 A | 4/2015 |
| RU | 2561625 C2 | 8/2015 |
| RU | 2578692 C2 | 3/2016 |
| TH | 1301005288 | 3/2012 |
| TH | 1301005896 | 4/2012 |
| TH | 1401002190 | 10/2012 |
| TH | 1401005939 | 3/2013 |
| WO | WO-98/13428 A1 | 4/1998 |
| WO | WO-01/55245 | 8/2001 |
| WO | WO-01/70866 | 9/2001 |
| WO | WO-02/08041 A1 | 6/2002 |
| WO | WO-2003/051798 A1 | 6/2003 |
| WO | WO-2005/028569 A2 | 3/2005 |
| WO | WO-2007/078416 A2 | 7/2007 |
| WO | WO-2008/056621 A1 | 5/2008 |
| WO | WO-2011/095986 A2 | 8/2011 |
| WO | 2012031183 A2 † | 3/2012 |
| WO | PCT/IN2012/000188 | 3/2012 |
| WO | PCT/IN2012/000263 | 4/2012 |
| WO | WO-2012/127504 A2 | 9/2012 |
| WO | PCT/IN2012/000698 | 10/2012 |
| WO | WO-2012/147097 A2 | 11/2012 |
| WO | WO-2012/175488 A2 | 12/2012 |
| WO | PCT/IN2013/000208 | 3/2013 |
| WO | WO-2013/098838 A2 | 7/2013 |
| WO | WO-2014/049445 A2 | 4/2014 |

OTHER PUBLICATIONS

Second Office Action was issued on May 30, 2016 by the Japanese Patent Office for JP Application No. 2014-537813, which was filed on Oct. 23, 2012 and published as 2015-501361 on Jan. 15, 2015 (Inventor—Juan Rodriguez et al; Applicant—Aditya Birla Nuvo Limited) (Translated—2 pages).

U.S. Appl. No. 14/834,567, filed Aug. 25, 2015, Chavan et al. (Aditya Birla Sci. & Tech. Co. Ltd.).

U.S. Appl. No. 14/432,342, filed Mar. 30, 2015, Chavan et al. (Aditya Birla Sci. & Tech. Co. Ltd.).

Anisimov, A.V. et al., Vanadium Peroxocomplexes as Oxidation Catalysts of Sulfur Organic Compounds by Hydrogen Peroxide in Bi-Phase Systems, Catal. Today, 78(3): 19-325 (2003).

Attar, A., Corcoran W. H., Desulfurization of organic sulfur compounds by selective oxidation. Regenerable and non regenerable oxygen carriers, Ind. Eng Chem Prod Res Dev, 17(2): 102-9 (1978).

Chen, L. Oxidative Desulfurization of Simulated Gasoline over Metal Oxide-loaded Molecular Sieve, Chin. J. Chem. Eng., 15(4): 520-523 (2007).

Collins, F.M. et al., Oxidative Desulphurisation of Oils Via Hydrogen Peroxide and Heteropolyanion Catalysis, J. Mol. Catal. A, 117(1-3): 397-403 (1997).

Dolbear, G. E., Skov E. R., Selective oxidation as a route to petroleum desulfurization, Am Chem Soc Div Pet Chem, 45: 375 (2000).

Filippis, P. et al., Oxidative Desulfurization: Oxidation Reactivity of Sulfur Compounds in Different Organic Mixes, Energy Fuels, 17(6): 1452-1455 (2003).

García-Gutiérrez, J.L. et al., Ultra-deep oxidative desulfurization of diesel fuel by the Mo/Al12O3—H2O2 system: The effect of system parameters on catalytic activity, Applied Catalysis A: General, 334: 366-373 (2008).

Hulea, V. et al., Mild Oxidation with $H_2O_2$ over Ti-Containing Molecular Sieves—A Very Efficient Method for Removing Aromatic Sulfur Compounds from Fuels, J. Catal., 198(2): 179-186 (2001).

Kong, L.Y. et al., Kinetics and Mechanism of Liquid-Phase Oxidation of Thiophene over TS-1 Using $H_2O_2$ Under Mild Conditions, Catal. Lett., 92(3-4): 163-167 (2004).

Mei, H. et al., A new method for obtaining ultra-low sulfur diesel fuel via ultrasound assisted oxidative desulfurization, Fuel, 82(4): 405-414 (2003).

Murata, S. et al., A novel oxidative desulfurization system for diesel fuels with molecular oxygen in the presence of cobalt catalysts and aldehydes, Energy Fuel, 18(1): 116-121 (2004).

Murti, et al., Influences of Nitrogen Species on the Hydrodesulphurization Reactivity of a Gas Oil Over Sulfide Catalysts of Variable Activity, Appl. Catal. A: General, 252(2): 331-346 (2003).

Otsuki, S. et al., Oxidative Desulfurization of Light Gas Oil and Vacuum Gas Oil by Oxidation and Solvent Extraction, Energy Fuels, 14:1232-1239 (2000).

(56) References Cited

OTHER PUBLICATIONS

Palomeque, J. et al., Oxidation of Dibenzothiophene by Hydrogen Peroxide Catalyzed by Solid Bases, J. Catal., 211(1): 103-108 (2002).
Ramírez-Verduzco L. F. et al., Desulfurization of Middle Distillates by Oxidation and Extraction Process, Pet. Sci. Technol. 22(1-2): 129-139 (2004).
Ramírez-Verduzco, L.F. et al., Desulfurization of Diesel by Oxidation/Extraction Scheme: Influence of the Extraction Solvent, Catal. Today, 98(1-2): 289-294 (2004).
Shiraishi, Y. et al., Desulfurization and Denitrogenation Process for Light Oils Based on Chemical Oxidation followed by Liquid-Liquid Extraction, Ind. Eng. Chem. Res., 41(17): 4362-4375 (2002).
Shiraishi, Y. et al., Visible light-induced desulfurization process for catalytic cracked gasoline using an organic two-phase extraction system, Ind. Eng. Chem. Res., 38: 4538-4544 (1999).
Shiraishi, Y., Hirai, T., Desulfurization of Vacuum Gas Oil Based on Chemical Oxidation Followed by Liquid-Liquid Extraction, Energy Fuels, 18(1): 37-40 (2004).
Sun, G, & D. Xia, Effect of metallic salt to desulfurization of light oils, J. Fuel Chem. Technol., 29(6): 509-514 (2001).
Tam, P.S. et al., Desulfurization of fuel oil by oxidation and extraction. 1. Enhancement of extraction oil yield, Ind. Eng. Chem. Res., 29: 321-324 (1990).
Tam, P.S. et al., Desulfurization of fuel oil by oxidation and extraction. 2. Kinetic modeling of oxidation reaction, Ind. Eng. Chem. Res., 29(3): 324-329 (1990).
Te, M. et al., Oxidation reactivities of dibenzothiophenes in polyoxometalate/$H_2O_2$ and formic acid/$H_2O_2$ systems, Appl. Catal. A Gen., 219: 267-280 (2001).
Wang, D. et al., Oxidative desulfurization of fuel oil: Part I. Oxidation of dibenzothiophenes using tert-butyl hydroperoxide, Appl Catal A: Gen, 253(1): 91-99 (2003).
Yazu, K. et al., Oxidation of Dibenzothiophenes in an Organic Biphasic System and Its Application to Oxidative Desulfurization of Light Oil, Energ. Fuels, 15(6): 1535-1536 (2001).
Yi, G.H. et al., Oxidative Dehydrogenation of Ethane Over $LA_{1-x}SR_xFeO_{3-\delta}$ Perovskite Oxides, Catalysts Letters, 38(3-4): 189-195 (1996).
Yu, G. et al., Diesel fuel desulfurization with hydrogen peroxide promoted by formic acid and catalyzed by activated carbon, Carbon, 43(11): 2285-2294 (2005).
Zannikos, F. et al., Desulfurization of petroleum fractions by oxidation and solvent extraction, Fuel Process Technol, 42(1): 35-45 (1995).
Zapata, B. et al., Catalyst Screening for Oxidative Desulfurization Using Hydrogen Peroxide, Catalysis Today, 106: 219-221 (2005).
Office Action issued Dec. 22, 2014 by the Canadian Intellectual Property Office for Canadian Patent Application No. 2,830,881, which was filed on Mar. 20, 2012 (Inventor—Chavan et al.; Applicant—Aditya Birla Science & Technology Co. Ltd.) (4 pages).
Response to Office Action issued Dec. 22, 2014 by the Canadian Intellectual Property Office for Canadian Patent Application No. 2,830,881, which was filed on Mar. 20, 2012 (Inventor—Chavan et al.; Applicant—Aditya Birla Science & Technology Co. Ltd.) (4 pages).
Office Action issued Aug. 12, 2015 by the Candian Intellectual Property Office for Canadian Patent Application No. 2,830,881, which was filed on Mar. 20, 2012 (Inventor—Chavan et al.; Applicant—Aditya Birla Science & Technology Co. Ltd.) (3 pages).
First Office Action issued on Sep. 1, 2014 by the State Intellectual Property Office of the People's Republic of China for Chinese Patent Application No. 201280014637.5, which was filed on Mar. 20, 2012 and published as CN103534337 on Jan. 22, 2014 (Inventor—Chavan et al; Applicant—Aditya Birla Science & Technology Co. Ltd.) (10 pages).
Second Office Action issued on Jun. 18, 2015 by the State Intellectual Property Office of the People's Republic of China for Chinese Patent Application No. 201280014637.5, which was filed on Mar. 20, 2012 and published as CN103534337 on Jan. 22, 2014 (Inventor—Chavan et al; Applicant—Aditya Birla Science & Technology Co. Ltd.) (9 pages).
Supplementary European Search Report and Opinion issued on Jul. 31, 2014 for European Patent Application No. 12760070.8, which was filed on Mar. 20, 2012 and published as 2688984 on Jan. 29, 2014 (Inventor—Chavan et al.; Applicant—Aditya Birla Science & Technology Co. Ltd.) (6 pages).
First Office Action issued on Oct. 29, 2014 by the Japanese Patent Office for Japanese Patent Application No. 2014-500543, which was filed on Mar. 20, 2012 (Inventor—Chavan et al; Applicant—Aditya Birla Science & Technology Co. Ltd.) (12 pages).
International Search Report and Written Opinion mailed on Oct. 18, 2012 by the International Searching Authority for International Application No. PCT/IN2012/000188, which was filed on and published as WO 2012/127504 on Sep. 27, 2012 (Inventor—Chavan et al.; Applicant—Aditya Birla Science & Technology Co. Ltd.) (9 pages).
International Preliminary Report on Patentability issued on Sep. 24, 2013 by the International Searching Authority for International Application No. PCT/IN2012/000188, which was filed on and published as WO 2012/127504 on Sep. 27, 2012 (Inventor—Chavan et al.; Applicant—Aditya Birla Science & Technology Co. Ltd.) (5 pages).
Office Action issued on Oct. 23, 2014 by the Patent Office of the Russian Federation for Russian Patent Application No. 2013147201, which was filed on Mar. 20, 2012 and published as 12 on Apr. 27, 2014 (Inventor—Chavan et al.; Applicant—Aditya Birla Science & Technology Co. Ltd.) (3 pages).
Preliminary Amendment filed on Sep. 23, 2013 for U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (3 pages).
Non-Final Office Action issued on May 23, 2014 by the U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (11 pages).
Response to Non-Final Office Action filed on Nov. 24, 2014 for U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (8 pages).
Final Office Action issued on Mar. 13, 2015 for U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (10 pages).
Response After Final Office Action filed on Sep. 14, 2015 for U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (10 pages).
Office Action issued on Mar. 12, 2015 by the Canadian Intellectual Property Office for Canadian Patent Application No. 2833208, which was filed on Apr. 12, 2012 (Inventor—Chavan et al.; Applicant—Aditya Birla Science & Technology Co. Ltd.) (3 pages).
First Office Action issued on Sep. 3, 2014 by the State Intellectual Property Office of the People's Republic of China for Chinese Patent Application No. 201280018300.1, which was filed on Apr. 12, 2012 and published as CN103635241 on Mar. 12, 2014 (Inventor—Chavan et al.; Applicant—Aditya Birla Science & Technology Co. Ltd.) (12 pages).
Second Office Action issued on Jul. 15, 2015 by the State Intellectual Property Office of the People's Republic of China for Chinese Patent Application No. 201280018300.1, which was filed on Apr. 12, 2012 and published as CN103635241 on Mar. 12, 2014 (Inventor—Chavan et al.; Applicant—Aditya Birla Science & Technology Co. Ltd.) (13 pages).
Supplementary European Search Report and Opinion issued on Dec. 1, 2014 for European Patent Application No. 12777572.4, which was filed on Apr. 12, 2012 and published as 2696954 on Feb. 19, 2014 (Inventor—Chavan et al.; Applicant—Aditya Birla Science & Technology Co. Ltd.) (4 pages).
Office Action issued on Feb. 12, 2015 by the Japanese Patent Office for Japanese Patent Application No. 2014-504453, which was filed on Apr. 12, 2012 and published as 2014-517798 on Jul. 24, 2014

(56) References Cited

OTHER PUBLICATIONS (Inventor—Chavan et al.; Applicant—Aditya Birla Science & Technology Co. Ltd.) (Partial Translation) (5 Pages).
Decision to Grant issued on Sep. 9, 2015 by the Japanese Patent Office for Japanese Patent Application No. 2014-504453, which was filed on Apr. 12, 2012 and published as 2014-517798 on Jul. 24, 2014 (Inventor—Chavan et al.; Applicant—Aditya Birla Science & Technology Co. Ltd.) (3 Pages).
International Search Report and Written Opinion mailed on Dec. 20, 2012 by the by the International Searching Authority for International Patent Application No. PCT/IN2012/000263, which was filed on Apr. 12, 2012 and published as WO 2012/147097 on Nov. 1, 2012 (Inventor—Chavan et al.; Applicant—Aditya Birla Science and Technology Co. Ltd.) (8 pages).
International Preliminary Report on Patentability issued on Oct. 15, 2013 by the International Searching Authority for International Patent Application No. PCT/IN2012/000263, which was filed on Apr. 12, 2012 and published as WO 2012/147097 on Nov. 1, 2012 (Inventor—Chavan et al.; Applicant—Aditya Birla Science and Technology Co. Ltd.) (5 pages).
Office Action issued on Dec. 23, 2014 by the Patent Office of the Russian Federation for Russian Patent Application No. 2013150805, which was filed on Apr. 12, 2012 ((Inventor—Chavan et al.; Applicant—Aditya Birla Science and Technology Co. Ltd.) (Translation only) (2 pages).
Preliminary Amendment filed on Oct. 10, 2013 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (5 pages).
Notice of Allowance issued on Jun. 2, 2014 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (8 pages).
Non-Final Office Action issued on Sep. 11, 2014 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (6 pages).
Response to Non-Final Office Action filed on Dec. 11, 2014 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (9 pages).
Notice of Allowance issued on Dec. 24, 2014 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (7 pages).
Notice of Allowance issued on Mar. 31, 2015 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (9 pages).
Issue Notificatioon issued on Aug. 25, 2015 for U.S. Appl. No. 14/111,048, filed Apr. 12, 2012 and issued as U.S. Pat. No. 9,114,988 on Aug. 25, 2015 (Inventor—Chavan et al.; Applicant—Aditya Birla Science & Technology Co. Ltd.) (1 page).
International Search Report and Written Opinion mailed on Mar. 20, 2014 by the International Searching Authority for International Patent Application No. PCT/IB2013/002825, which was filed on Sep. 27, 2013 and published as WO 2014/049445 on Apr. 3, 2014 (Inventor—Chavan et al.; Applicant—Aditya Birla Science and Technology Co. Ltd.) (11 pages).
International Preliminary Report on Patentability issued on Mar. 31, 2015 by the International Searching Authority for International Patent Application No. PCT/IB2013/002825, which was filed on Sep. 27, 2013 and published as WO 2014/049445 on Apr. 3, 2014 (Inventor—Chavan et al.; Applicant—Aditya Birla Science and Technology Co. Ltd.) (8 pages).
Preliminary Amendment filed on Mar. 30, 2015 for U.S. Appl. No. 14/432,343, filed Mar. 30, 2015 (Inventor—Chavan et al.; Applicant—Aditya Birla Science & Technology Co. Ltd.) (6 pages).
First Office Action issued on May 14, 2015 by the State Intellectual Property Office of the People's Republic of China for Chinese Patent Application No. 201280060806.9, which was filed on Oct. 23, 2012 and published as CN104136551 on Nov. 5, 2014 ( (Inventor—Rodriguez et al.; Applicant—Aditya Birla Science and Technology Co. Ltd.) (only translation provided) (8 pages).
Supplementary European Search Report and Opinion issued on Jul. 31, 2015 for European Patent Application No. 12862639.7, which was filed on Oct. 23, 2012 and publixhed as 2771414 on Sep. 3, 2014 (Inventor—Rodriguez et al.; Applicant—Aditya Birla Science & Technology Co. Ltd.) (7 pages).
Office Action issued on Jun. 24, 2015 by the Japanese Patent Office for Japanese Patent Application No. 2014-537813, which was filed on Oct. 23, 2012 and published as 2015-501361 on Jan. 15, 2015 (Inventor—Rodriguez et al; Applicant—Aditya Birla Science & Technology Co. Ltd.) (6 pages).
International Search Reprot and Written Opinion mailed on Jun. 19 2013 by the by the Internatiional Searching Authority for International Patent Application No. PCT/IN2012/000698, which was filed on Oct. 23, 2012 and published as WO 2013/098838 on Jul. 4, 2013 (Inventor—Rodriguez et al.; Applicant—Aditya Birla Science and Technology Co. Ltd.) (7 pages).
International Preliminary Report on Patentability issued on Apr. 29, 2014 by the by the International Searching Authority for International Patent Application No. PCT/IN2012/000698, which was filed on Oct. 23, 2012 and published as WO 2013/098838 on Jul. 4, 2013 (Inventor—Rodriguez et al.; Applicant—Aditya Birla Science and Technology Co. Ltd.) (5 pages).
Office Action issued on Jun. 17, 2015 by the Patent Office of the Russian Federation for Russian Patent Application No. 2014121026, which was filed on Oct. 23, 2013 (Inventor—Rodriguez et al.; Applicant—Aditya Birla Science and Technolgy Co. Ltd.) (only translation provided) (2 pages).
First Office Action issued on Jul. 27, 2015 by the State Intellectual Property Office of the People's Republic of China for Chinese Patent Application No. 201380020228.0, which was filed on Mar. 28, 2013 and published as CN104334650 on Feb. 4, 2015 (Inventor—Chavan et al.; Applicant—Aditya Birla Science and Technology Co. Ltd.) (only translatin provided) (9 pages).
International Search Report and Written Opinion mailed on Jan. 14, 2014 by the by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science and Technology Co. Ltd.) (8 pages).
International Preliminary Report on Patentability issued Oct. 1, 2014 by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science and Technology Co. Ltd.) (6 pages).
Preliminary Amendment filed on Sep. 30, 2014 for U.S. Appl. NO. 14/389,438, filed Sep. 30, 2014 and published as US 2015/0056127 (Inventor—Chavan et al.; Applicant—Aditya Birla Science & Technology Co. Ltd.) (5 pages).
Office Action issued Aug. 12, 2015 by the Canadian Intellectual Property Office for Canadian Patent Application No. 2,830,881, which was filed on Mar. 20, 2013 (Inventor—Chavan et al.; Applicant—Aditya Birla Science & Technology Co. Ltd.) (3 pages).
Office Action issued Dec. 22, 2014 by the Canadian Intellectual Property Office for Canadian Patnet Application No. 2,830,881, which was filed on Mar. 20, 2013 (Inventor—Chavan et al.; Applicant—Aditya Birla Science & Technology Co. Ltd.) (4 pages).
Response to Office Action issued Jun. 22, 2015 by the Candian Intellectual Property Office for Canadian Patent Application No. 2,830,881, which was filed on Mar. 20, 2012 (Inventor—Chavan et al.; Applicant—Aditya Birla Science & Technology Co. Ltd.) (4 pages).
Supplementary European Search Reprot and Opinion issued on Jul. 31, 2015 for European Patnet Application No. 12862639.7, which was filed on Oct. 23, 2012 and published as 2771414 on Sep. 3, 2014 (Inventor—Rodriguez et al.; Applicant—Aditya Birla Science & Technology Co. Ltd.) (2 pages).
Non-Final Office Action issued on Mar. 26, 2015 for U.S. Appl. No. 14/353,610, filed Apr. 23, 2014 and published as US 2014/0290532

(56) References Cited

OTHER PUBLICATIONS on Oct. 2, 2014 (Inventor—Rodriguez et al.; Applicant—Aditya Birla Science & Technology Co. Ltd.) (11 pages).
Final Office Action issued on Dec. 31, 2015 for U.S. Appl. No. 14/353,610, filed Apr. 23, 2014 and published as US 2014/0290532 on Oct. 2, 2014 (Inventor—Rodriguez et al.; Applicant—Aditya Birla Science and Technology Co.) (16 pages).
Third Office Action issued on Dec. 3, 2015 by the State Intellectual Property Office of the People's Republic of China for Chinese Patent Application No. 201280014637.5, which was filed on Mar. 20, 2012 and published as CN103534337 on Jan. 22, 2014 (Inventor—Chavan et al; Applicant—Aditya Birla Science & Technology Co. Ltd.) (5 pages—Original // 6 pages Translation).
First Office Action issued on Dec. 28, 2015 by the State Intellectual Property Office of the People's Republic of China for Chinese Patent Application No. 2013800551012 (Inventor—Chavan et al; Applicant—Aditya Birla Science & Technology Co. Ltd.) (Original—7 pages // Translation—9 pages).
Response to Non-Final Office Action filed on Sep. 28, 2015 for U.S. Appl. No. 14/353,610, filed Apr. 23, 2014 and published as US 2014/0290532 on Oct. 2, 2014 (Inventor—Rodriguez et al.; Applicant—Aditya Birla Science and Technology Co.) (8 pages).
Supplementary European Search Report and Opinion issued on Dec. 1, 2014 for European Patent Application No. 12777572.4, which was filed on Apr. 12, 2012 and published as 2696954 on Feb. 19, 2014 (Inventor13 Chavan et al.; Applicant—Aditya Birla Science & Technology Co. Ltd.) (4 pages).
Third Office Action issued on Mar. 23, 2016 by the State Intellectual Property Office of the People's Republic of China for Chinese Patent Application No. 201280018300.1, which was filed on Apr. 12, 2012 and published as CN103635241 on Mar. 12, 2014 (Inventor—Chavan et al.; Applicant—Aditya Birla Science & Technology Co. Ltd.) (5 pages).
Second Office Action issued on Dec. 22, 2015 by the State Intellectual Property Office of the People's Republic of China for Chinese Patent Application No. 201280060806.9, which was filed on Oct. 23, 2012 and published as CN104136551 on Nov. 5, 2014 ((Inventor—Rodriguez et al.; Applicant—Aditya Birla Science and Technology Co. Ltd.) (only translation provided) (3 pages).
Non-Final Office Action issued on Feb. 22, 2016 for U.S. Appl. No. 14/006,803, filed Sep. 23, 2013 and published as US 2014/0014557 on Jan. 16, 2014 (Inventor—Chavan et al.; Applicant—Aditya Birla Science & Technology Co. Ltd.) (11 pages).
Decision to Grant issued on Apr. 10, 2015 by the Patent Office of the Russian Federation for Russian Patent Application No. 2013147201, which was filed on Mar. 20, 2012 and published as 12 on Apr. 27, 2014 (Inventor—Chavan et al.; Applicant—Aditya Birla Science & Technology Co. Ltd.) (5 pages).
Huang, et al., "La1-xSrxCoO3 Perovskite Catalyst and the Study of Combustion in VOCs," Journal of Molecular Catalysis, vol. 19 (5), pp. 351-354. (Abstract—1 page).
Second Office Action dated Aug. 18, 2016 by the State Intellectual Property Office of the People's Republic of China for Chinese Patent Application No. 2013800551012 (Inventor—Chavan et al; Applicant—Aditya Birla Science & Technology Co. Ltd.; (Original—7 pages//Translation—14 pages).
Communication pursuant to Article 94(3) EPC dated Oct. 28, 2016 for European Patent Application No. 12862639.7, which was filed Oct. 23, 2012 and published as 2771414 on Sep. 3, 2014 (Inventor—Rodriguez et al.; Applicant—Aditya Birla Science & Technology Co. Ltd.; (7 pages).
Office Action dated Nov. 15, 2015 by the Japanese Patent Office for Japanese Patent Application No. 2015-502559, which was filed Oct. 28, 2013 and published as 2015-514832 dated May 21, 2015 (Inventor—Chavan, et al; Applicant—Aditya Birla Science & Technology Co. Ltd.; (Original—5 pages//Translation—4 pages).
Final Office Action dated Dec. 29, 2016 by the U.S. Patent and Trademark Office for U.S. Appl. No. 14/006,803, which was filed Sep. 23, 2013 and published as US 2014/0014557 dated Jan. 16, 2014 (Inventor—Chavan et al.; Applicant—Aditya Birla Science & Technology Co. Ltd.; (11 pages).
Office Action was dated Nov. 21, 2016 by the Japanese Patent Office for JP Application No. 2015-502559, which was filed Mar. 28, 2013 and published as 2015-514832 dated May 21, 2015 (Applicant—Aditya Birla Science and Technology Co. Pte. Ltd) (Original—5 pages//Translated 4 pages).
Final Rejection was dated Dec. 29, 2016 by the U.S. Patent and Trademark Office for U.S. Appl. No. 14/006,803, which was filed Sep. 23, 2013 and published as US 2014/0014557 dated Jan. 16, 2014 (Inventor—Chavan et al.; Applicant—Aditya Birla Science & Technology Co. Ltd.; (11 pages).
Response to Office Action was dated Feb. 4, 2016 to the Canadian Patent Office for CA Application No. 2830881, which was filed Mar. 23, 2011 and published as 2,830,881 dated Oct. 11, 2016 (Applicant—Aditya Birla Science and Technology Co. Ltd) (2 pages).
Notice of Allowance was dated Mar. 1, 2016 by the Canadian Patent Office for CA Application No. 2830881, which was filed Mar. 23, 2011 and published as 2,830,881 dated Oct. 11, 2016 (Applicant—Aditya Birla Science and Technology Co. Ltd) (1 page).
Grant of Patent was dated Oct. 11, 2016 by the Canadian Patent Office for CA Application No. 2830881, which was filed Mar. 23, 2011 and published as 2,830,881 dated Oct. 11, 2016 (Applicant—Aditya Birla Science and Technology Co. Ltd) (1 page).
Response to Second Office Action was dated Sep. 2, 2015 to the SIPO for CN Application No. 201280014637.5, which was filed Mar. 20, 2012 and granted as 103534337 dated Aug. 31, 2016 (Applicant—Aditya Birla Science and Technology Co. Ltd) (Original—4 pages//Translated—1 page).
Response to Third Office Action was dated Feb. 18, 2016 to the SIPO for CN Application No. 201280014637.5, which was filed Mar. 20, 2012 and granted as 103534337 dated Aug. 31, 2016 (Applicant—Aditya Birla Science and Technology Co. Ltd) (Original—3 pages//Translated—1 page).
Notification of Grant Patent was dated May 27, 2016 by the SIPO for CN Application No. 201280014637.5, which was filed Mar. 20, 2012 and granted as 103534337 dated Aug. 31, 2016 (Applicant—Aditya Birla Science and Technology Co. Ltd) (Original—2 pages//Translated—2 pages).
Communication pursuant to Rules 70(2) and 70a(2) EPC was dated Aug. 22, 2014 by the European Patent Office for EP Application No. 12760070.8, which was filed Mar. 20, 2012 and published as 2688984 dated Jan. 29, 2014 (Applicant—Aditya Birla Science and Technology Co. Ltd) (2 pages).
Communication pursuant to Article 94(3) EPC was dated Feb. 26, 2016 by the European Patent Office for EP Application No. 12760070.8, which was filed Mar. 20, 2012 and published as 2688984 dated Jan. 29, 2014 (Applicant—Aditya Birla Nuvo Ltd) (4 pages).
Response to EP Communication was dated Sep. 6, 2016 to the European Patent Office for EP Application No. 12760070.8, which was filed Mar. 20, 2012 and published as 2688984 dated Jan. 29, 2014 (Applicant—Aditya Birla Nuvo Ltd) (8 pages).
Response to Office Action was dated Apr. 30, 2015 to the Japanese Patent Office for JP Application No. 2014-500543, which was filed Mar. 20, 2012 and granted as 5841229 dated Nov. 20, 2015 (Applicant—Aditya Birla Science and Technology Co. Ltd) (Original—2 pages//Translated—3 pages).
Decision to Grant a Patent was dated Oct. 13, 2015 by the Japanese Patent Office for JP Application No. 2014-500543, which was filed Mar. 20, 2012 and granted as 5841229 dated Nov. 20, 2015 (Applicant—Aditya Birla Science and Technology Co. Ltd) (Original—3 pages//Translated—3 pages).
Response to Office Action was dated Sep. 14, 2015 to the Canadian Patent Office for CA Application No. 2833208, which was filed Mar. 23, 2011 and granted as 2,833,208 dated Jun. 28, 2016 (Applicant—Aditya Birla Science and Technology Co. Ltd) (6 pages).
Notice of Allowance was dated Nov. 19, 2015 by the Canadian Patent Office for CA Application No. 2833208, which was filed Mar. 23, 2011 and granted as 2,833,208 dated Jun. 28, 2016 (Applicant—Aditya Birla Science and Technology Co. Ltd) (1 page).
Notification of Grant Patent was dated Jan. 9, 2017 by the SIPO for CN Application No. 201280018300.1, which was filed Apr. 12,

(56) References Cited

OTHER PUBLICATIONS 2012 and granted as ZL2021280018300.1 dated Apr. 19, 2017 (Applicant—Aditya Birla Science and Technology Co. Ltd) (Original—2 pages//Translated—2 pages).
Second Office Action was dated Aug. 18, 2016 to the SIPO for CN Application No. 2013800551012, which was filed Sep. 27, 2013 and published as 104812481 dated Jul. 29, 2015 (Applicant—Aditya Birla Science and Technology Co. Ltd) (Original—9 pages//Translated—6 page).
Third Office Action was dated Mar. 31, 2017 to the SIPO for CN Application No. 2013800551012, which was filed Sep. 27, 2013 and published as 104812481 dated Jul. 29, 2015 (Applicant—Aditya Birla Science and Technology Co. Ltd) (Original—8 pages//Translated—11 page).
Communication pursuant to Rules 161(1) and 162 EPC was dated May 7, 2015 by the European Patent Office for EP Application No. 13820884.8, which was filed Sep. 27, 2013 (Applicant—Aditya Birla Science and Technology Co. Ltd) (2 pages).
Requirement for Restriction/Election was dated Mar. 10, 2017 by the USPTO for U.S. Appl. No. 14/432,342, which was filed Mar. 30, 2015 and published as US 2015-0252272 A1 dated Sep. 10, 2015 (Applicant—Aditya Birla Science and Technology Co. Ltd) (7 pages).
Notification of Grant Patent was dated Jan. 9, 2017 by the SIPO for CN Application No. 201280060806.9, which was filed Oct. 23, 2012 and granted as ZL201280060806.9 dated Sep. 21, 2016 (Applicant—Aditya Birla Nuvo Ltd) (Original—2 pages//Translated—2 pages).
Communication pursuant to Article 94(3) EPC was dated Oct. 28, 2016 by the European Patent Office for EP Application No. 12862639.7, which was filed Oct. 23, 2012 and published as 2771414 dated Sep. 3, 2014 (Applicant—Aditya Birla Nuvo Ltd) (2 pages).
Response to EP Communication was dated May 8, 2017 to the European Patent Office for EP Application No. 12862639.7, which was filed Oct. 23, 2012 and published as 2771414 dated Sep. 3, 2014 (Applicant—Aditya Birla Nuvo Ltd) (7 pages).
Decision of Refusal was dated Mar. 23, 2017 by the Japanese Patent Office for JP Application No. 2014-537813, which was filed Oct. 23, 2012 and published as 2015-501361 dated Jan. 15, 2015 (Applicant—Aditya Birla Science and Technology Co. Ltd) (Original—2 pages//Translated—2 pages).
Decision to Grant a Patent was dated Apr. 10, 2015 by the Russian Patent Office for RU Application No. 2014121026, which was filed Oct. 23, 2012 and granted as 2578692 dated Feb. 29, 2016 (Applicant—Aditya Birla Science and Technology Co. Ltd) (Original—1 page).
Second Office Action was dated May 23, 2016 to the SIPO for CN Application No. 201380020228.0, which was filed Mar. 28, 2013 and granted as 104334650 dated Apr. 26, 2017 (Applicant—Aditya Birla Science and Technology Co. Ltd) (Original—3 pages//Translated—4 page).
Notice of Grant was dated Jan. 18, 2017 to the SIPO for CN Application No. 201380020228.0, which was filed Mar. 28, 2013 and granted as 104334650 dated Apr. 26, 2017 (Applicant—Aditya Birla Science and Technology Co. Ltd) (Original—2 pages//Translated—2 page).
Communication pursuant to Rules 161(1) and 162 EPC was dated Nov. 26, 2014 by the European Patent Office for EP Application No. 13753350.1, which was filed Mar. 28, 2013 and published as 2831182 dated Feb. 4, 2015(Applicant—Aditya Birla Science and Technology Co. Ltd) (1 page).
Response to EP Communication pursuant to Rules 161(1) and 162 EPC was dated Jun. 8, 2015 to the European Patent Office for EP Application No. 13753350.1, which was filed Mar. 28, 2013 and published as 2831182 dated Feb. 4, 2015 (Applicant—Aditya Birla Science and Technology Co. Ltd) (5 pages).
Office Action was dated Mar. 24, 2017 by the Russian Patent Office for RU Application No. 2014143796, which was filed Mar. 28, 2013 and published as 15 dated May 27, 2016 (Applicant—Aditya Birla Science and Technology Company Limited) (Original—8 Pages//Translated—6 pages).
Office Action dated Apr. 26, 2017 by the Intellectual Mexican Institute for Industrial Property for Mexican Patent Application No. MX/a/2014/011811, which was filed Mar. 28, 2013 and published on May 13, 2015 (Applicant—Aditya Birla Science and Technology Company Limited) (Original—2 Pages//Translation—2 pages).
Office Action dated May 3, 2017 by the Russian Patent Office for RU Patent Application No. 2015115969, which was filed Sep. 27, 2013 (Applicant—Aditya Birla Science and Technology Company Limited) (Original—6 Pages//Translation—3 pages).
Communication Pursuant to Article 94(3)EPC dated Jun. 16, 2017 by the European Patent Office for Patent Application No. 13753350.1, which was filed Mar. 28, 2013 and published as 2831182 dated Feb. 4, 2015 (Inventor—Chavan et al.; Applicant—Aditya Birla Science and Technology Co., Ltd.; (6 pages).
Notification of Granting Patent Right and Notification of Going through the Formalities of Registration dated Aug. 3, 2017 by the State Intellectual Property Office of the People's Republic of China for Patent Application No. 2013800551012, which was filed Sep. 27, 2013 and published as 104812481 dated Jul. 29, 2015 (Inventor—Chavan et al.; Applicant—Aditya Birla Science & Technol. Co., Ltd.; (Original—2 pages;Translation—3 pages).
Non-Final Office Action dated Aug. 17, 2017 by the U.S. Patent and Trademark Office for U.S. Appl. No. 14/432,342, which was filed Mar. 30, 2015 and published as US 2015/0252272 dated Sep. 10, 2015 (Inventor—Chavan et al.; Applicant—Aditya Birla Science & Technol. Co., Ltd.; (10 pages).
Office Action dated Jul. 31, 2017 by the Japan Patent Office for Patent Application No. 2015502559, which was filed Mar. 28, 2013 and published as 2015-514832 dated May 21, 2015 (Inventor—Chavan et al.; Applicant—Aditya Birla Science & Technol. Co., Ltd.; (Translation only—2 pages).
Notice of Allowance and Reporting Letter dated Jun. 21, 2017 by the Intellectual Property Office of Mexico for Patent Application No. MX/a/2014/011811, which was filed Mar. 28, 2013 and published on May 13, 2015 (Inventor—Chavan et al.; Applicant—Aditya Birla Science & Technol. Co., Ltd.; (4 pages).
Decision to Grant dated Aug. 25, 2017 by the Russian Patent Office for Application No. 2015115969, which was filed on Sep. 27, 2013 (Applicant—Aditya Birla Science and Technology Co. Ltd.; (Original—9 pages//Translation—5 pages).
Office Action dated Oct. 6, 2017 by the Japanese Patent Office for Patent Application No. 2015-533716, which was filed on Sep. 27, 2013 and published as 2015-532320 on Nov. 9, 2015 (Applicant—Aditya Birla Science and Technology Co. Ltd.; (Original: 3 pages//Translation: 4 pages).
Xu, et al; English Abstract of CN 101856619; Espacenet Bibliographic Information.†

\* cited by examiner
† cited by third party

PROCESS FOR THE PRODUCTION OF CARBON BLACK

FIELD OF DISCLOSURE

The present disclosure relates to a low hysteresis carbon black and an improved process for obtaining the low hysteresis carbon black.

BACKGROUND

A variety of carbon blacks are known in the art. These carbon blacks primarily differ in properties from each other and are made by different procedures. The use of the carbon black depends upon its properties. Since the carbon black as such cannot be sufficiently characterized by its chemical composition or by its ingredients, it has become widely accepted to characterize the carbon black by the properties it exhibits. Thus, the carbon black can, for e.g., be characterized by its surface area, which is usually an inverse measurement of the primary particle size. Another important characteristic of the carbon black is its structure, which is a measure of the complexity of the individual carbon black aggregates or of the number of primary particles "fused" together in one carbon black aggregate.

One common application of the carbon black is as a performance enhancing filler in rubber and other polymers. The reinforcing action of the carbon black depends on the interaction, both chemical and physical, between the carbon black and the polymeric matrix. This interaction also governs the performance of the filled rubber/polymer and its applications in several aspects. Efforts have been made to correlate properties of the rubber incorporating the carbon black and properties of the carbon black. There is not found any single property of carbon black that, if made high or low enough, results in an ideal rubber composition. Where certain properties of the carbon black are related to abrasion resistance of the rubber, others are related to the tensile strength or heat build-up.

It is found that high abrasion resistance of a carbon black/rubber composition is one desirable property of such composition. Another desirable property is low heat build-up or low hysteresis. The heat build-up is a measurement of how much of the elastic deformation energy put into a product made of carbon black/rubber compound remains in the compound as heat after the deformation forces have been released. The hysteresis or heat build-up is measured by measuring the temperature of a sample subjected to deformations. This property is extremely crucial when making tires with such carbon black/rubber composition. The higher the heat build-up, the greater the energy loss of the vehicle using the tyres (hence, lower the fuel efficiency); also, chances are that tires made from such rubbers are destroyed sooner. It is, therefore, very desirable to reduce the heat build-up of rubber compositions by providing low hysteresis carbon black. Several attempts have been made in the past to provide processes for producing low hysteresis carbon blacks. Some of these processes are cited below.

U.S. Pat. No. 4,988,493 discloses a process and apparatus for producing carbon blacks which give low hysteresis and good wear when used in rubber compounds for reinforcement, particularly in rubber tires. The process comprises supplying a linear, substantially non-swirling flow of the combustion gases into a feedstock oil injection zone in a reactor, supplying at least two independently controlled streams of carbon black feedstock oil into separate segments of the flow of the combustion gases in the feedstock oil injection zone, wherein separate carbon black forming reactions are respectively effected in separate segments of the flow of combustion gases, and immediately thereafter supplying the combustion gas segments in which said separate carbon black forming reactions have been effected into an aggregate-forming zone whereby a carbon black product is produced which, when compounded in rubber compositions, provides said rubber compositions with improved hysteresis loss and treadwear resistance properties.

U.S. Pat. No. 4,327,069 discloses a process for producing carbon black of negative tint residual by pyrolytic decomposition of hydrocarbons in a carbon black furnace. The process comprises producing a first carbon black forming mixture in a first carbon black forming zone which is a high structure zone, passing the first carbon black forming mixture from the first carbon black forming zone to a second carbon black forming zone which is a low structure zone to produce a second carbon black forming mixture, passing the second carbon black forming mixture into a quench zone where the second carbon black forming mixture is contacted with a quench fluid to produce a carbon black containing smoke at a temperature below carbon black formation temperature, and separating carbon black of negative tint residual from the smoke.

The known processes of the prior art require complex process control to obtain carbon black with low hysteresis. There is, therefore, felt a need for a simple process for producing carbon black in-which the surface chemistry of the carbon black is conveniently altered during the manufacturing process to produce carbon black, which, when combined with rubber compositions decreases the hysteresis and thus lowers the heat build-up in the rubber composition to thereby provide high-performance tires.

OBJECTS

It is therefore an object of the present disclosure to provide a simple and economic process for the preparation of surface modified carbon black which when combined with rubber/polymer compositions as reinforcement helps to reduce the hysteresis; the surface modified carbon black is particularly suitable for making high-performance rubber tires.

These objects and other advantages of the present disclosure will be more apparent from the following description.

SUMMARY

In accordance with the present disclosure, there is provided a process for producing a surface modified carbon black comprising the step of treating carbon black with a sulfur-containing compound to obtain the surface modified carbon black which when combined with a polymer composition alters the carbon black-polymer interaction to decrease the hysteresis of the polymer composition by at least 1%, preferably by about 1% to 20%.

Typically, the sulfur-containing compound is selected from the group consisting of sodium sulfate, sodium sulfide, sodium sulfite, sodium polysulfide, sodium thiosulfate, phenylene disulfide, alkali metal sulfate, alkali metal sulfite, alkali metal sulfide, alkaline earth metal sulfate, alkaline earth metal sulfite, alkaline earth metal sulfide, and mixtures thereof.

Typically, the sulfur-containing compound is used in an amount in the range of 0.005-1% of the carbon black.

In accordance with the present disclosure, the sulfur-containing compound is added during the manufacturing of the carbon black or after the manufacturing of the carbon black.

Typically, the method step of treating carbon black with a sulphur-containing compound is carried out by a technique selected from the group consisting of pouring, spraying, injecting, dispersing and diffusing.

In accordance with the one of the embodiments of the present disclosure the sulfur-containing compound is in the form of dispersion.

In accordance with another embodiment of the present disclosure the process further comprises a step of mixing the sulfur-containing compound with process water to pelletize the carbon black.

BRIEF DESCRIPTION OF THE ACCOMPANYING DRAWINGS

Figure 2:
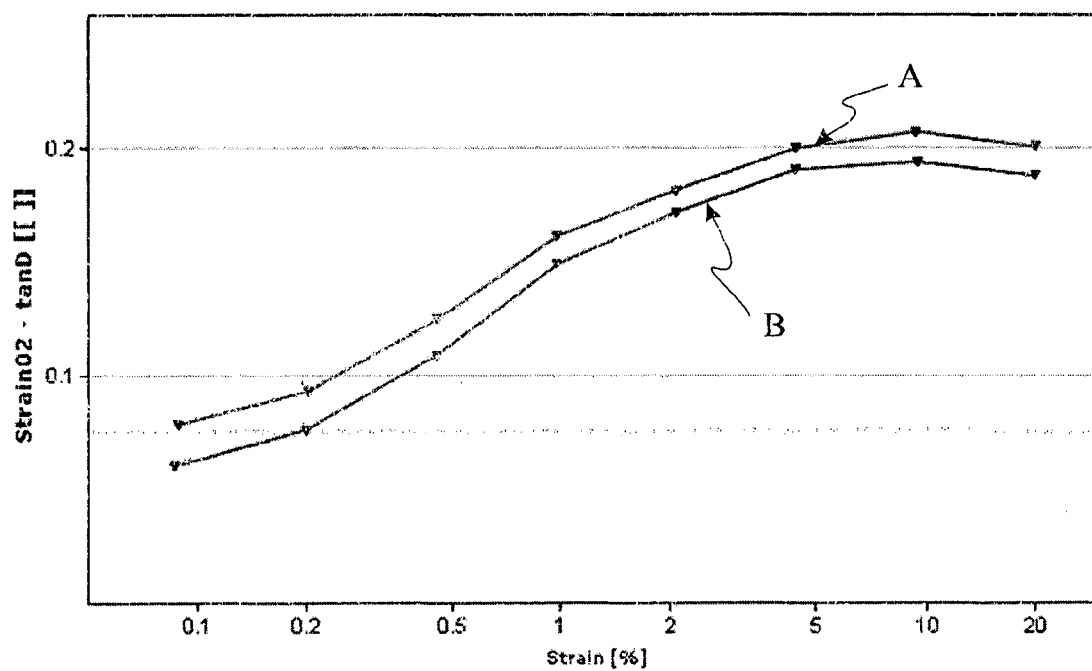

The invention will now be described with the help of the accompanying drawings, in which:

FIG. 1 illustrates a comparison of curing curves of rubber compounds prepared with unmodified carbon black N234 (A) and sodium sulphide treated modified carbon black N234 (B), in accordance with the present disclosure; and FIG. 2 illustrates a comparison of Tan Delta curves of rubber compounds prepared With unmodified carbon black N234 (A) and sodium sulphide treated modified carbon black N234 (B), in accordance with the present disclosure.

DETAILED DESCRIPTION

The present disclosure envisages a surface modified carbon black, which when combined with a polymer composition, alters the carbon black-polymer interaction to decrease the hysteresis of the polymer composition by at least 1%. The properties of the carbon black that make it a useful additive/reinforcement in the polymer are established in the carbon black during its manufacturing. The properties like particle size, shape and degree of aggregation are controlled by regulating the operating parameters during the manufacturing process. It is found that the surface chemistry of the carbon black, formed in the manufacturing process, impacts the performance of the carbon black as reinforcement in a polymer composition. The surface chemistry of the carbon black can be changed by introducing surface modifying compounds onto the carbon black surface, preferably during the manufacturing of the carbon black. A benefit of altering the surface chemistry of the carbon black is to modify the carbon black-polymer interactions when the carbon black is added to a polymer composition, so as to reduce the hysteresis of the polymer-carbon black compound. The carbon black obtained in accordance with the process of the present disclosure is particularly suitable for making rubber compositions with low hysteresis for use in making tires with low heat build-up.

The process for producing surface modified carbon black comprises the step of treating carbon black with a sulfur-containing compound in an amount in the range of 0.005%-1% of the carbon black to effect formation of surface groups. The surface modified carbon black thus obtained when combined with a polymer composition alters the carbon black-polymer interaction to decrease the hysteresis of the polymer composition by at least 1%, preferably by about 1% to 20%. The sulfur-containing compound is selected from the group consisting of sodium sulfate, sodium sulfide, sodium sulfite, sodium polysulfide, sodium thiosulfate, phenylene disulfide, alkali metal sulfate, alkali metal sulfite, alkali metal sulfide, alkaline earth metal sulfate, alkaline earth metal sulfite, alkaline earth metal sulfide, and mixtures thereof.

In accordance with the present disclosure the carbon black is treated with a sulphur-containing compound by a technique selected from the group consisting of pouring, spraying, injecting, dispersing and diffusing.

The sulfur-containing compound is preferably introduced in the carbon black during the manufacturing of the carbon black in the furnace reactor by a method selected from pouring, spraying, injecting, dispersing and diffusing, resulting in the surface modified carbon black whose surface is treated such as to provide beneficial properties of reduced hysteresis in a polymer composition in which the modified carbon black is used as reinforcement.

The sulfur-containing compound can be alternatively added by a technique such as spraying on the carbon black surface post-manufacturing.

In accordance with the one of the embodiments of the present disclosure the sulfur-containing compound is in the form of dispersion. Typically, the dispersion is prepared by mixing the sulfur-containing compound with a solvent, preferably water, for convenient introduction on the carbon black surface. The sulfur-containing compound can be mixed with process water provided to pelletize the carbon black during the manufacturing process.

The sulfur-containing compound when added in an amount in the range of 0.005%-1% of the carbon black, results in the formation of surface groups on the carbon black, which alter the carbon black-polymer interactions due to formation of bonds between the carbon black particles and polymer molecules, when added to a polymer composition to reduce the hysteresis of the composition. The lower hysteresis manifests itself in the form of lower tan delta of the composition. Tan delta, the ratio of the viscous component to the elastic component of the response to a deformation, is a measure of the hysteresis of the composition. A lower tan delta indicates a composition with lower hysteresis. The results indicating the reduced Tan Delta in surface modified carbon black are illustrated in the FIG. 2.

The disclosure will now be described with reference to the following non-limiting examples which do not limit the scope and ambit of the disclosure.

EXAMPLES

Example 1

500 g of unpelletized carbon black (N234 grade) was taken in a tray and sprayed uniformly with a solution of 2.5 g $Na_2S$ in water (500 mL), with slow exposure of all surfaces of the carbon black to the solution. The carbon black was turned over several times over a period of 2 hours, to promote good coverage. The resultant modified carbon black was heated in an oven under a reducing atmosphere, at 800° C. for 8 hours, with a turnover of 4-5 times every 2 hours. The dried modified carbon black was used to prepare a rubber compound and tested (Labeled: N234-1-LAB). The properties of this compound were compared with those of a rubber compound prepared using unmodified carbon black N234 (Labeled: N234-UNMOD).

Preparation of Rubber Compound

The composition of the tested rubber compounds are provided herein below.

| Ingredients | Quantity, parts per hundred (pph) |
| --- | --- |
| Natural Rubber (RSS4 Grade) | 75 |
| Butadiene Rubber (1220 Grade) | 25 |
| Carbon Black (N234 grade) | 50 |
| Zinc Oxide | 4 |
| Stearic Acid | 2 |
| Antioxidant (6PPD) | 1.5 |
| Sulfur | 1 |
| Accelerator (CBS) | 1 |

The ingredients were mixed on a 2-roll mill at a friction ratio of 1:1.4 for a duration of about 24 minutes. The rollers were maintained at a temperature of 70° C.

Testing of Rubber Properties:

The properties of the prepared rubber compounds were tested. A summary of the test results is given in Table 1.

TABLE 1

Comparison of properties of rubber compounds using unmodified carbon black N234, and sodium sulfide treated modified carbon black N234, in lab-scale production

| Sample Name | Loading of $Na_2S$, ppm | Maximum Tan Delta Value (from Rubber Process Analyzer) | % Reduction in Tan Delta vs. baseline |
| --- | --- | --- | --- |
| N234-UNMOD (Baseline) | 0 | 0.218 | 0 |
| N234-1-LAB | 5000 | 0.211 | 3.21 |

Example 2

100 ppm of sodium sulfide ($Na_2S$) per unit mass of carbon black, was added to the manufacturing process in the pelletization step, by adding a 2% solution of $Na_2S$ in water (previously prepared) at an appropriate flow-rate into the pelletizer. The treated carbon black was then dried as per the usual industrial process, in a rotary drier. The samples of the treated, pelleted, dried carbon black were collected and compounded with rubber for testing (Labeled: N234-2-IND).

Preparation of Rubber Compound

The composition of the tested rubber compounds are provided herein below.

| Ingredients | Quantity, parts per hundred (pph) |
| --- | --- |
| Natural Rubber (RSS4 Grade) | 75 |
| Butadiene Rubber (1220 Grade) | 25 |
| Carbon Black (N234 grade) | 50 |
| Zinc Oxide | 4 |
| Stearic Acid | 2 |
| Antioxidant (6PPD) | 1.5 |
| Sulfur | 1 |
| Accelerator (CBS) | 1 |

The ingredients were mixed on a 2-roll mill at a friction ratio of 1:1.4 for a duration of about 24 minutes. The rollers were maintained at a temperature of 70° C.

Testing of Rubber Properties

The properties of the prepared rubber compounds were tested. A summary of the test results is given in Table 2.

TABLE 2

Comparison of properties of rubber compounds using unmodified N234, and sodium sulfide treated modified carbon black N234, in industrial process

| Sample Name | Loading of Na2S, ppm | Maximum Tan Delta Value (from Rubber Process Analyzer) | Reduction in Tan Delta vs. baseline, % |
| --- | --- | --- | --- |
| N234-UNMOD (Baseline) | 0 | 0.196 | 0 |
| N234-2-IND | 100 | 0.189 | 3.57 |

From the Examples 1 & 2 it is clearly demonstrated that a significant reduction in tan delta is achieved by both the lab treatment and the industrial treatment. However, the industrial treatment of the carbon black, during its manufacturing, with very small amounts of sodium sulfide, is more effective in reducing the tan delta of the rubber compound.

The curing curves of the rubber, compounded with the unmodified carbon black N234, and sodium sulfide treated modified carbon black N234 are shown in FIG. 1 of the accompanying drawings. The hysteresis in the rubber compounds prepared using the carbon black is estimated by measuring the curing tan delta of the compound, and is shown in FIG. 2 of the accompanying drawings.

The curing curves A and B illustrated in the FIG. 1 clearly show that the rubber compound containing the sodium sulfide treated modified carbon black N234 of the present disclosure cures more easily, likely because of the greater interactions between the rubber polymer and the surface groups on the treated carbon black as compared to the rubber compound with the unmodified carbon black. Likewise, the tan delta curves A and B illustrated in the FIG. 2 show that the rubber compound prepared with the sodium sulfide treated modified carbon black N234 of the present disclosure exhibits a lower tan delta, and therefore a lower hysteresis, than the rubber compound prepared with the unmodified carbon black.

Technical Advantages

The process as described in the present disclosure has several technical advantages including but not limited to the realization of: the disclosure provides a simple and economic process for producing a surface modified carbon black, in which carbon black is treated with a sulfur compound in an amount in the range of 0.005%-1% of the carbon black to effect in-situ formation of surface groups to produce the surface modified carbon black which when combined with a polymer composition alter the carbon black-polymer interaction to decrease the hysteresis of the polymer composition by at least 1%, preferably by about 1% to 20%, the surface modified carbon black is particularly suitable for making high performance tires with reduced hysteresis and low heat build-up.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the invention, unless there is, a statement in the specification specific to the contrary.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A process for producing a surface modified carbon black comprising the step of treating carbon black with a sulfur-containing compound to obtain the surface modified carbon black which when combined with a polymer composition alters the carbon black-polymer interaction to decrease the hysteresis of the polymer composition by at least 1%, wherein the sulfur-containing compound is selected from the group consisting of alkali metal sulfate, alkali metal sulfite, alkali metal sulfide, alkaline earth metal sulfate, alkaline earth metal sulfite, alkaline earth metal sulfide, and mixtures thereof, wherein the sulfur-containing compound is used in an amount in the range of 0.005-1% by weight of the carbon black.

2. The process as claimed in claim 1, wherein the sulfur-containing compound is further selected from the group consisting of sodium sulfate, sodium sulfide, sodium sulfite, sodium polysulfide, sodium thiosulfate, and mixtures thereof.

3. The process as claimed in claim 1, wherein the decrease in the hysteresis of the polymer composition is in the range of 1% to 20%.

4. The process as claimed in claim 1, wherein the sulfur-containing compound is added during the manufacturing of the carbon black.

5. The process as claimed in claim 1, wherein the sulfur-containing compound is added after the manufacturing of the carbon black.

6. The process as claimed in claim 1, wherein the method step of treating carbon black with a sulfur-containing compound is carried out by a technique selected from the group consisting of pouring, spraying, injecting, dispersing and diffusing.

7. The process as claimed in claim 1, wherein the sulfur-containing compound is in the form of dispersion.

8. The process as claimed in claim 1, further comprises a step of mixing the sulfur-containing compound with process water to pelletize the carbon black.

9. A surface modified carbon black prepared according to the process of claim 1 comprising a sulfur-containing compound, wherein the sulfur-containing compound is surface bounded by surface modification of a carbon black with the sulfur-containing compound selected from the group consisting of alkali metal sulfate, alkali metal sulfite, alkali metal sulfide, alkaline earth metal sulfate, alkaline earth metal sulfite, alkaline earth metal sulfide, and mixtures thereof, and wherein the surface modified carbon black when mixed with an elastomeric polymer exhibits a decrease in the hysteresis of the elastomeric polymer by at least 1%.

10. An elastomeric composition comprising the carbon black prepared accordingly to claim 1.

11. An elastomeric composition comprising the surface modified carbon black of claim 9.

* * * * *